US006687601B2

(12) United States Patent
Bale et al.

(10) Patent No.: US 6,687,601 B2
(45) Date of Patent: Feb. 3, 2004

(54) SYSTEM FOR DIAGNOSING AN AIR HANDLING MECHANISM OF AN INTERNAL COMBUSTION ENGINE

(75) Inventors: Carlton Bale, Columbus, IN (US); Yue Yun Wang, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 124 days.

(21) Appl. No.: 10/103,638

(22) Filed: Mar. 21, 2002

(65) Prior Publication Data

US 2003/0182049 A1 Sep. 25, 2003

(51) Int. Cl.[7] .......................... F02M 25/07; G06G 7/70; G06F 19/00; F02D 23/00

(52) U.S. Cl. ...................... 701/108; 701/114; 73/118.1; 123/568.16; 60/602; 60/605.2; 60/324

(58) Field of Search ................................ 701/100, 101, 701/102, 103, 107, 108, 114, 29, 34; 123/568.11, 568.12, 568.16, 568.21; 73/117.3, 118.1, 118.2; 60/602, 605.2, 324

(56) References Cited

U.S. PATENT DOCUMENTS

| | | | | | |
|---|---|---|---|---|---|
| 4,046,003 | A | * | 9/1977 | Armstrong et al. | 73/118.1 |
| 4,748,567 | A | * | 5/1988 | Sumizawa et al. | 701/114 |
| 5,461,569 | A | | 10/1995 | Hara et al. | 701/101 |
| 5,671,141 | A | | 9/1997 | Smith et al. | 701/29 |
| 5,848,381 | A | | 12/1998 | Ishii et al. | 702/99 |
| 5,995,887 | A | | 11/1999 | Hathaway et al. | 701/34 |
| 6,078,851 | A | | 6/2000 | Sugitani | 701/34 |
| 6,092,016 | A | * | 7/2000 | Sarangapani et al. | 701/114 |
| 6,122,577 | A | | 9/2000 | Mergenthaler et al. | 701/34 |
| 6,175,787 | B1 | | 1/2001 | Breed | 701/29 |
| 6,208,917 | B1 | | 3/2001 | McKissick, Jr. et al. | 701/34 |
| 6,223,107 | B1 | | 4/2001 | Mergenthaler et al. | 701/34 |
| 6,226,576 | B1 | | 5/2001 | Torno et al. | 701/34 |
| 6,236,908 | B1 | | 5/2001 | Cheng et al. | 701/102 |
| 6,285,298 | B1 | | 9/2001 | Gordon | 340/945 |
| 6,298,718 | B1 | * | 10/2001 | Wang | 73/118.1 |
| 6,314,375 | B1 | | 11/2001 | Sasaki et al. | 702/34 |
| 6,457,461 | B1 | * | 10/2002 | Romzek | 123/568.16 |
| 6,497,227 | B2 | * | 12/2002 | Wang et al. | 123/568.16 |
| 6,543,227 | B2 | * | 4/2003 | He et al. | 60/602 |
| 2001/0027362 | A1 | | 10/2001 | Nishida et al. | 701/34 |
| 2002/0087258 | A1 | * | 7/2002 | Johnson | 701/114 |

* cited by examiner

*Primary Examiner*—Willis R. Wolfe
(74) *Attorney, Agent, or Firm*—Barnes & Thornburg

(57) ABSTRACT

A system for diagnosing an air handling mechanism of an internal combustion engine includes an air handling mechanism actuator, an air handling mechanism position sensor, a sensor associated with an engine operating condition separate from the air handling mechanism yet responsive to changes in the position of the mechanism actuator, and a control computer. The control computer is responsive to the position sensor signal and the engine operating condition sensor to diagnose faults/failure conditions associated with any of the air handling mechanism, the mechanism position sensor and the mechanism actuator. The air handling mechanism may be any of an EGR valve, a variable geometry turbocharger, a wastegate valve and an exhaust throttle, and the engine operating condition sensor may be associate with any of air intake pressure, air intake temperature, mass flow rate of intake air, exhaust gas pressure, EGR mass flow rate or turbocharger speed.

43 Claims, 4 Drawing Sheets

AMBIENT AIR
EXHAUST GAS
WARNING INDICATORS
INTAKE AIR COOLER
INTAKE MANIFOLD
ENGINE 12
FS
EXHAUST MANIFOLD
EGR COOLER
ΔP
CONTROL COMPUTER
MEMORY
WP
WV
VGT
VGTP
ET
ETP
F
TS
$M_I$
IAT
EXP
FC
ES
IAP
EGRP
EV
ΔP
$M_{EGR}$
N

210

EGR VALVE POSTIION (%)

| TURBO SPEED (RPM) | ≥50% | <50% |
| --- | --- | --- |
| ≤1000 RPM | NO FAULT | EGR VALVE POSTITION SENSOR FAULT |
| >1000 RPM | EGR VALVE STUCK CLOSED | EGR VALVE ACTUATOR INOPERATIVE |

SYSTEM FOR DIAGNOSING AN AIR HANDLING MECHANISM OF AN INTERNAL COMBUSTION ENGINE

FIELD OF THE INVENTION

The present invention relates generally to diagnostic systems for internal combustion engines, and more specifically to systems for diagnosing an air handling mechanism of the engine based on air handling system response analysis.

BACKGROUND AND SUMMARY OF THE INVENTION

Systems for diagnosing engine components based strictly on the behavior of such components are known and have been implemented extensively in the automotive and diesel engine industries. However, with such conventional diagnostic approaches, it is difficult to diagnose some fault conditions associated with electrically actuatable control mechanisms.

For example, a control system coupled to an internal combustion engine may include a control mechanism having an actuator responsive to an actuator command to control the mechanism to a specified position, and a position sensor producing a signal indicative of a position of the mechanism relative to a reference position. Using conventional diagnostic techniques, the sensor signal is typically analyzed to determine the overall operability of the mechanism and/or to determine fault conditions associated with the sensor itself. However, fault conditions and/or failure modes may occur with respect to the actuator and/or the mechanism itself that are undetectable via analysis of the sensor signal alone. As one specific example, the signal produced by a control valve position sensor may indicate that the valve is moving and operating normally even though a failure condition exists that prevents the valve from forming a proper seal with a valve-sealing surface.

It is accordingly desirable to develop a component diagnostic strategy that provides the capability to distinguish between fault conditions and/or failure modes associated with a control mechanism, an actuator of the control mechanism and a position sensor associated with the control mechanism.

In accordance with the present invention, the response of one or more engine components, separate from and in addition to the position of a control mechanism, is included in the diagnostic analysis. By additionally considering the response of one or more engine operating components to a control mechanism command, fault conditions and/or failure modes may be distinguished as being associated with the control mechanism, the control mechanism actuator or the control mechanism position sensor.

These and other objects of the present invention will become more apparent from the following description of the preferred embodiment.

DESCRIPTION OF THE PREFERRED EMBODIMENTS

Figure 1:
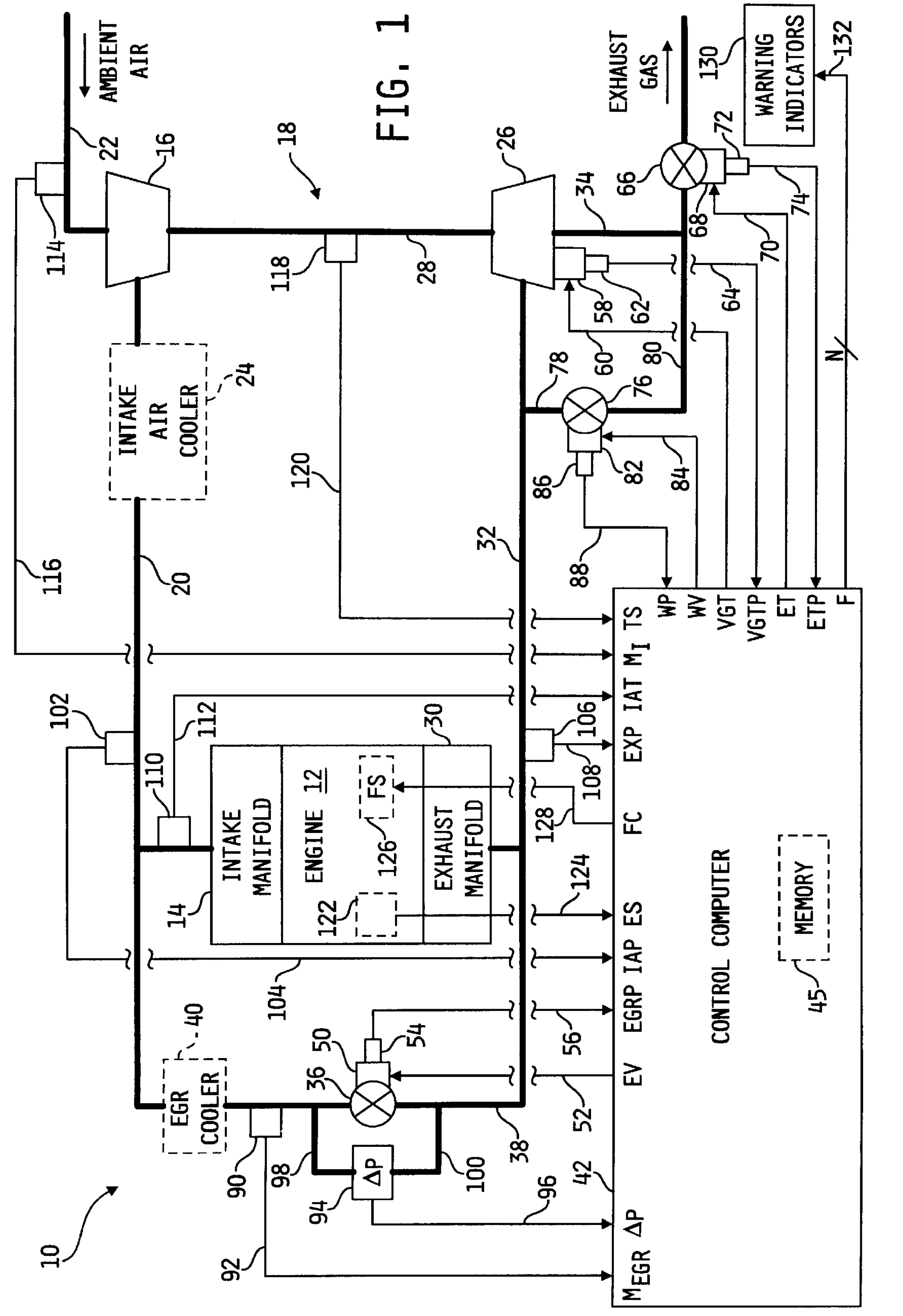
FIG. 1 is a diagrammatic illustration of one preferred embodiment of a system for diagnosing an air handling mechanism of an internal combustion engine, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, a diagrammatic illustration of one preferred embodiment of a system 10 for diagnosing an air handling mechanism of an internal combustion engine, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. Optionally, as shown in phantom in FIG. 1, system 10 may include an intake air cooler 24 of known construction disposed in-line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1.

System 10 includes a control computer 42 that is preferably microprocessor-based and is generally operable to control and manage the overall operation of engine 12. Control computer 42 includes a memory unit 45 as well as a number of inputs and outputs for interfacing with various sensors and systems coupled to engine 12. Control computer 42, in one embodiment, may be a known control unit sometimes referred to as an electronic or engine control module (ECM), electronic or engine control unit (ECU) or the like, or may alternatively be a control circuit capable of operation as will be described hereinafter. In any case, control computer 42 preferably includes one or more control algorithms, as will be described in greater detail hereinafter, for controlling an operating condition of engine 12.

Control computer 42 includes a number of inputs for receiving signals from various sensors or sensing systems associated with system 10. For example, system 10 may include a mass airflow sensor 90 disposed in fluid communication with EGR conduit 38 and electrically connected to an EGR mass flow rate input, $M_{EGR}$ of control computer 42 via signal path 92. Sensor 90 may be located on either side of the EGR valve 36, and in any case, mass airflow sensor 90 may be of known construction and operable to produce a mass airflow signal on signal path 92 indicative of the mass flow rate of recirculated exhaust gas flowing through the EGR conduit 38.

System 10 further includes a differential pressure sensor, or ΔP sensor, 94 fluidly coupled at one end to EGR conduit 38 adjacent to an exhaust gas outlet of EGR valve 36 via conduit 98, and fluidly coupled at its opposite end to EGR conduit 38 adjacent to an exhaust gas outlet of EGR valve 36 via conduit 100. Alternatively, the ΔP sensor 94 may be coupled across another flow restriction mechanism disposed in-line with EGR conduit 38. In either case, the ΔP sensor 94 may be of known construction and is electrically connected to a ΔP input of control computer 42 via signal path 96. The ΔP sensor 94 is operable to provide a differential pressure signal on signal path 94 indicative of the pressure differential across EGR valve 36 or other flow restriction mechanism disposed in-line with EGR conduit 38.

System 10 further includes an intake air pressure sensor 102 disposed in fluid communication with intake conduit 20 and electrically connected to an intake air pressure input, IAP, of control computer 42 via signal path 104. Alternatively, pressure sensor 102 may be disposed in fluid communication with intake manifold 14. In any case, pressure sensor 102 may be of known construction, and is operable to produce a pressure signal on signal path 104 indicative of air pressure within intake conduit 20 and intake manifold 14. Pressure sensor 102 may sometimes be referred to as a so-called "boost pressure" sensor because it is operable to sense changes in pressure (i.e., "boost" pressure) within conduit 20 and intake manifold 14 resulting from the operation of the turbocharger 18. Pressure sensor 102 may, in other cases, be referred to as a compressor outlet pressure sensor since it is operable to sense pressure changes in conduit 20 resulting from the operation of the turbocharger compressor 16, and in other cases pressure sensor 102 is referred to as an intake manifold pressure sensor since it is operable to sense air pressure within intake manifold 14. Pressure sensor 102 may accordingly be referred to as any of a boost pressure sensor, a compressor outlet pressure sensor, an intake manifold pressure sensor, and the term "intake air pressure" sensor is intended to encompass all such terminology for pressure sensor 102.

System 10 may further include an exhaust pressure sensor 106 fluidly coupled to exhaust conduit 32, or alternatively to exhaust manifold 30. In either case, pressure sensor 106 may be of known construction and is electrically connected to an exhaust pressure input, EXP, of control computer 42 via signal path 108. The pressure sensor 106 is operable to provide a pressure signal on signal path 108 indicative of the pressure of exhaust gas produced by engine 12 within exhaust manifold 14 and exhaust conduit 32.

System 10 further includes an intake air temperature sensor 110 disposed in fluid communication with intake conduit 20 and electrically connected to an intake air temperature input, IAT, of control computer 42 via signal path 112. Alternatively, temperature sensor 110 may be disposed in fluid communication with intake manifold 14. In any case, temperature sensor 110 may be of known construction, and is operable to produce a temperature signal on signal path 112 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 36.

System 10 may further include a mass airflow sensor 114 disposed in fluid communication with intake conduit 22 and electrically connected to an intake mass flow rate input, $M_{EGR}$ of control computer 42 via signal path 116. Sensor 114 may be of known construction and operable to produce a mass airflow signal on signal path 116 indicative of the mass flow rate of ambient air entering an ambient air inlet of compressor 16.

System 10 further includes a turbocharger speed sensor 118 disposed about, or in proximity with, the turbocharger drive shaft 28 and electrically connected to a turbocharger speed input, TS, of control computer 42 via signal path 120. Sensor 118 may be of known construction and is generally operable to produce a turbocharger speed signal on signal path 120 that is indicative of the rotational speed of the turbocharger drive shaft 28. In one embodiment, sensor 58 is a variable reluctance sensor operable to determine turbocharger rotational speed by sensing passage thereby of one or more detectable structures formed on shaft 28. Alternatively, turbocharger speed sensor 118 may be any other known sensor operable as just described and suitably located relative to turbocharger drive shaft 28.

System 10 further includes an engine speed sensor 122 electrically connected to an engine speed input, ES, of control computer 42 via signal path 124. Engine speed sensor 122 is operable to sense rotational speed of the engine 12 and produce an engine speed signal on signal path 124 indicative of engine rotational speed. In one embodiment, sensor 122 is a Hall effect sensor operable to determine engine speed by sensing passage thereby of a number of equi-angularly spaced teeth formed on a gear or tone wheel. Alternatively, engine speed sensor 122 may be any other known sensor operable as just described including, but not limited to, a variable reluctance sensor or the like.

Control computer 42 also includes a number of outputs for controlling one or more engine functions associated with system 10. For example, engine 12 includes a fuel system 126 electrically connected to a fuel command output, FC, of control computer 42 via signal path 128. Control computer 42 is responsive to a number of engine operating condition signals, in a manner well-known in the art, to determine and generate fueling commands on signal path 128. Fuel system 126 is responsive to the fueling commands on signal path 128 to supply fuel to engine 12.

EGR valve 38 includes an EGR valve actuator 50 that is electrically connected to an EGR valve control output, EV, of control computer 42 via signal path 52. Control computer 42 is operable, as is known in the art, to produce an EGR valve control signal on signal path 52 to thereby control the position of EGR valve 36 relative to a reference position. Control computer 42 is accordingly operable to control EGR valve 36 to selectively provide a flow of recirculated exhaust gas from exhaust manifold 30 to intake manifold 14. EGR valve 36 further includes an EGR valve actuator position sensor 54 electrically connected to an EGR position input, EGRP, of control computer 42 via signal path 56. Position sensor 54 may be of known construction and operable to produce a position signal on signal path 56 indicative of the position of the EGR valve actuator 50 relative to a reference position.

Control computer 42 also includes at least one output for controlling turbocharger swallowing capacity and/or efficiency, wherein the term "turbocharger swallowing capacity" is defined for purposes of the present invention as the exhaust gas flow capacity of the turbocharger turbine 26, and the term "turbocharger swallowing efficiency" refers to the ability of the turbocharger turbine 26 to process the flow of exhaust gas exiting the exhaust manifold 30. In general, the swallowing capacity and/or efficiency of the turbocharger 18 directly affects a number of engine operating conditions including, for example, but not limited to, compressor outlet pressure, turbocharger rotational speed and exhaust pressure; i.e., the pressure of exhaust gas within exhaust manifold and exhaust conduit 32, and exemplary embodiments of some turbocharger swallowing capacity/efficiency control mechanisms are illustrated in FIG. 1. For example, one turbocharger swallowing capacity control mechanism that may be included within system 10 is a known electronically controllable variable geometry turbocharger turbine 26. In this regard, turbine 26 includes a variable geometry actuator 58 electrically connected to a variable geometry turbocharger position output, VGTP, of control computer 42 via signal path 60. Control computer 42, in one embodiment, is operable to produce a variable geometry turbocharger control signal on signal path 60, and variable geometry turbocharger actuator 58 is responsive to this control signal to control the swallowing capacity (i.e., exhaust gas flow capacity) of turbine 26 by controlling the flow geometry of turbine 26 in a known manner. System 10 further includes a variable geometry turbocharger actuator position sensor electrically connected to a variable geometry turbocharger actuator position input, VGTP, of control computer 42 via signal path 64. Position sensor 62 may be of known construction and operable to produce a position signal on signal path 64 indicative of the position of the VGT actuator 58 relative to a reference position.

Another turbocharger swallowing capacity control mechanism that may be is included within system 10 is a known electronically controllable exhaust throttle 66 having an exhaust throttle actuator 68 electrically connected to an exhaust throttle position output, ET, of control computer 42 via signal path 70. In one embodiment, exhaust throttle 66 is disposed in-line with exhaust conduit 34 as illustrated in FIG. 1, although the present invention contemplates that exhaust throttle 66 may alternatively be disposed in-line with exhaust conduit 32. Control computer 42, in one embodiment, is operable to produce an exhaust throttle control signal on signal path 70, and exhaust throttle actuator 66 is responsive to this control signal to control the position of exhaust throttle 66 relative to a reference position. The position of exhaust throttle 66 defines a cross-sectional flow area therethrough, and by controlling the cross-sectional flow area of the exhaust throttle 66, control computer 42 is operable to control the flow rate of exhaust gas through exhaust manifold 30, exhaust conduit 32, turbine 26 and exhaust conduit 34, and thus the swallowing capacity (i.e., exhaust gas flow capacity) of turbine 26. Control computer 42 is accordingly operable to control exhaust throttle 66 to selectively define a flow rate of exhaust gas produced by engine 12. Exhaust throttle 66 further includes an exhaust throttle actuator position sensor 72 electrically connected to an exhaust throttle position input, ETP, of control computer 42 via signal path 74. Position sensor 72 may be of known construction and operable to produce a position signal on signal path 74 indicative of the position of the exhaust throttle 66 relative to a reference position.

One turbocharger swallowing efficiency control mechanism that may be included within system 10 is a known electronically controllable wastegate valve 76 having a wastegate valve actuator 80 electrically connected to a wastegate valve control output, WV, of control computer 42 via signal path 82. Wastegate valve 76 has an inlet fluidly coupled via conduit 78 to exhaust conduit 32, and an outlet fluidly coupled to exhaust conduit 34 via conduit 80. In embodiments of system 10 including both a wastegate valve 76 and an exhaust throttle 66, the outlet of wastegate valve 76 may be fluidly coupled to exhaust conduit 34 upstream of exhaust throttle 66 as shown in FIG. 1, or may alternatively be coupled to exhaust conduit 34 downstream of exhaust throttle 66. In either case, control computer 42, in one embodiment, is operable to produce a wastegate valve control signal on signal path 84, and wastegate valve actuator 82 is responsive to this control signal to control the position of wastegate valve 76 relative to a reference position. The position of wastegate valve 76 defines a cross-sectional flow area therethrough, and by controlling the cross-sectional flow area of the wastegate valve 76, control computer 42 is operable to selectively divert exhaust gas away from turbocharger turbine 26, and accordingly control the swallowing efficiency of the turbocharger turbine 26. Wastegate valve 76 further includes a wastegate valve actuator position sensor 86 electrically connected to a wastegate valve position input, WP, of control computer 42 via signal path 88. Position sensor 86 may be of known construction and operable to produce a position signal on signal path 88 indicative of the position of the wastegate valve 76 relative to a reference position.

It is to be understood that while FIG. 1 is illustrated as including all of the foregoing turbocharger swallowing capacity/efficiency control mechanisms (i.e., variable geometry turbine 26, exhaust throttle 70 and wastegate valve 76), the present invention contemplates embodiments of system 10 that include any single one, or any combination, of such control mechanisms. Additionally, control computer 42 may be configured to control any one or combination of such control mechanisms to thereby control turbocharger swallowing capacity and/or efficiency in a known manner.

System 10 further includes a number of warning indicators 130 electrically connected to a fault/failure output of control computer 42 via a number, N, of signal paths 132. Control computer 42 is operable to produce control signals on any one or more of the N signal paths 132 to control the operation of one or more corresponding suitably positioned warning indicators 130.

The present invention is directed to a strategy for diagnosing faults/failures associated with any one or more of the air handling system mechanisms just described; namely the EGR valve 36, variable geometry turbocharger turbine 26, exhaust throttle 66 and/or wastegate 76, as a function of a corresponding commanded actuator position and resulting actuator position, and further as a function of another engine/air handling system operating condition other than the resulting actuator position. Such a strategy allows for discrimination of the source of a detected fault/failure as between the actuator position sensor, the actuator, and the air handling mechanism itself.

Figure 2:
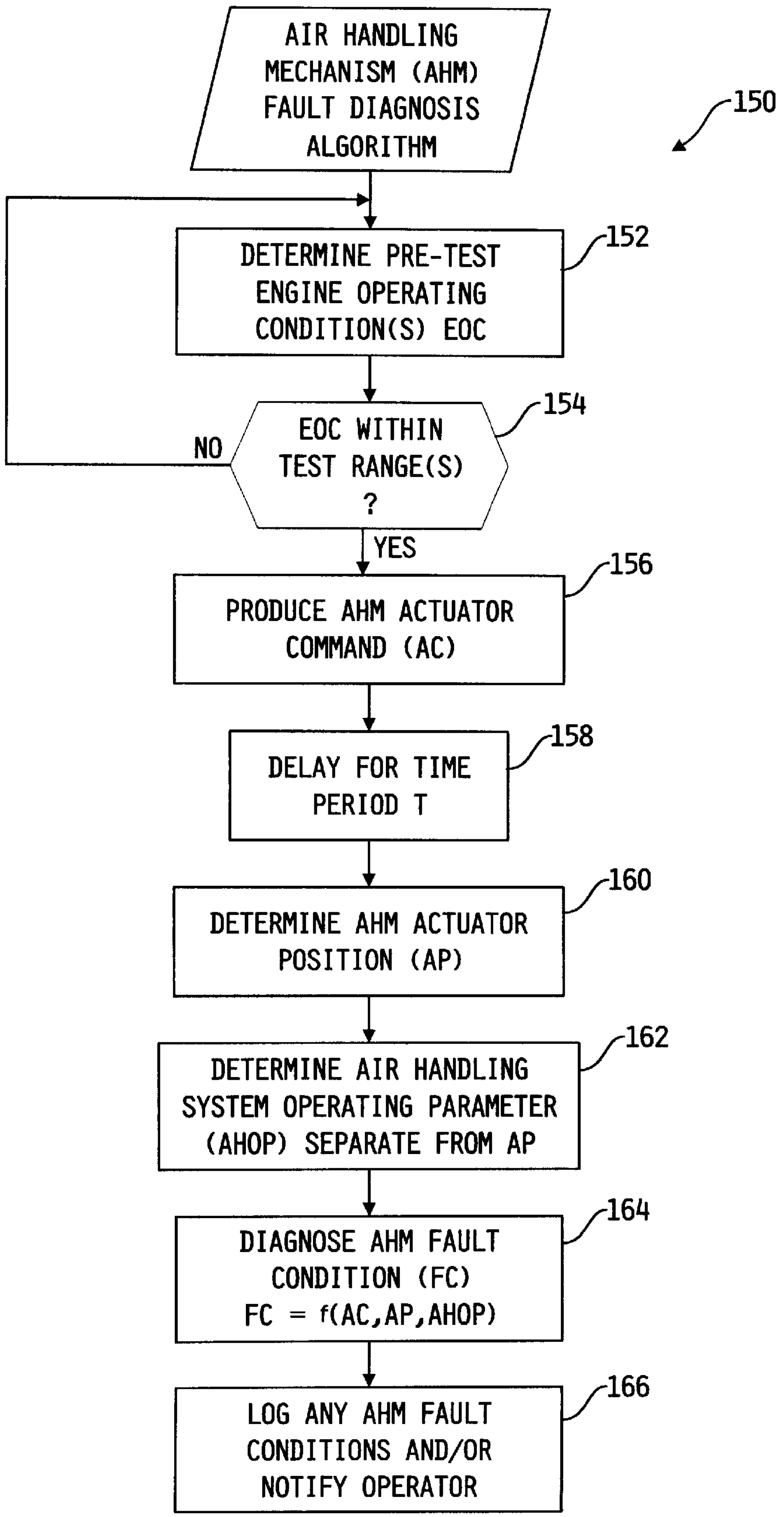
FIG. 2 is a flowchart illustrating one preferred embodiment of a software algorithm for diagnosing an air handling system mechanism in the system of FIG. 1, in accordance with the present invention.

Referring now to FIG. 2, a flowchart is shown illustrating one preferred embodiment of a software algorithm 150 for diagnosing an air handling system mechanism in the system of FIG. 1, in accordance with the present invention. Algorithm 150 may be stored within memory 45 and is executed by control computer 42 in a manner known in the art. Algorithm 150 begins at step 152 where control computer 42 is operable to determine any of a number of pre-test engine operating condition(s), EOC, to be satisfied before executing the fault diagnosis portion of algorithm 150. Thereafter at step 154, control computer is operable to compare the number of pre-test engine operating condition(s), EOC, to predefined test ranges therefore. If any/all such comparisons is/are answered in the negative, algorithm execution loops back to step 152. If, on the other hand, any/all such comparisons are answered in the positive, algorithm execution advances to step 156.

In general, an engine or air handling system operating response or responses to a commanded air handling mechanism actuator position may depend upon one or more specific engine operating conditions at the time the diagnostic algorithm is executed, and one or more pre-test engine operating conditions may therefore be required to be satisfied before executing the diagnostic portion of algorithm 150 in order to accurately specify an expected engine or air handling system operating response or responses. For example, the rotational speed of the turbocharger 18 depends upon engine speed, and specification of an engine speed range prior to monitoring turbocharger speed may accordingly be required as a pre-test engine operating condition. As a specific example, steps 152 and 154 may require engine speed to be within an engine idling speed range in order to identify an expected turbocharger speed response to actuation of the EGR valve 36, as will be described by example hereinafter with respect to FIGS. 3A–4. As another example, the mass flow rate of ambient air entering the inlet of the turbocharger compressor 16 depends upon engine speed and load, and specification of engine speed and load ranges prior to monitoring ambient air mass flow rate may accordingly be required as pre-test engine operating conditions. As a specific example, steps 152 and 154 may require engine speed to be above or within a specified speed range, and engine load to be above a threshold load level in order to identify an expected ambient air mass flow rate response to actuation of the wastegate valve 76, VGT 26 and/or exhaust throttle 66. Any one or more such pre-test conditions may be specified by steps 152 and 154, and the specific conditions just described are provided only by way of example, and are not intended to be limiting.

From the "yes" branch of step 154, algorithm 150 advances to step 156 where control computer 42 is operable to produce an air handling system actuator command, AC, for commanding any one of the air handling system actuators 50, 58, 68 or 76 to a desired position. As one specific example, AC may correspond to a command by control computer 42 to open the EGR valve 36 from a closed position to a fully open position. As another example, AC may correspond to a command by control computer 42 to open the wastegate valve 76 from a fully closed to a 30% open position. As a further example, AC may correspond to a command by control computer 42 to close the exhaust throttle 66 from a fully open (maximum airflow therethrough) position to a 50% closed position. In general, the present invention contemplates that AC may correspond to a command by control computer 42 to move any of actuators 50, 58, 68 and 76 from any initial position to any final position.

Following step 156, algorithm execution advances to step 158 where control computer 42 is operable to delay for a time period, T, to allow engine operating conditions to respond or react to the change in air handling mechanism actuator position resulting from the actuator command, AC. Those skilled in the art will appreciate that the time period, T, will generally depend upon the actuators and/or engine operating conditions being monitored, and will accordingly be dictated by the specific application of algorithm 150.

Following step 158, algorithm execution advances to step 160 where control computer is operable to determine a position, AP, of the air handling mechanism actuator that was commanded at step 156. Thus, for example, if AC corresponds to a command by control computer 42 to move the position of the EGR valve actuator 50, then AP corresponds to the EGR valve position signal, EGRP, on signal path 56. If AC corresponds to a command by control computer 42 to move the position of the VGT actuator 58, then AP corresponds to the VGT position signal, VGTP, on signal path 64, if AC corresponds to a command by control computer 42 to move the position of the exhaust throttle actuator 68, then AP corresponds to the exhaust throttle position signal, ETP, on signal path 74, and if AC corresponds to a command by control computer 42 to move the position of the wastegate actuator 82, then AP corresponds to the wastegate position signal, WP, on signal path 88.

Following step 160, algorithm execution advances to step 162 where control computer is operable to determine an engine or air handling system operating parameter, AHOP, separate from the air handling mechanism actuator position signal, AP, determined at step 160. In general, AHOP may correspond to any engine and/or air handling system operating parameter producing an expected response to the air handling mechanism actuator command, AC. For example, if AC corresponds to a command by control computer 42 to move the position of the EGR valve actuator 50 from a closed position to a fully open position under engine idling conditions, then turbocharger rotational speed should be expected to decrease from an initial speed to somewhere within a lesser speed range, and AHOP in this case may correspond to the turbocharger speed signal on signal path 120. Keeping with the same air handling mechanism example, if AC corresponds to a command by control computer 42 to move the position of the EGR valve actuator 50 from a closed to an open position, the mass air flow rate, $M_{EGR}$, of exhaust gas through EGR conduit 38 should be expected to increase, the pressure, EXP, within the exhaust conduit 32 should be expected to decrease, the mass flow rate, $M_I$, of ambient air entering the inlet of the turbocharger compressor 16 should be expected to decrease, the pressure differential, ΔP, across the EGR valve 36 should be expected to decrease, the pressure, IAP, within the intake conduit 20 should be expected to decrease, and the temperature, IAT, of air entering the intake manifold 14 should be expected to increase. Signals producing any of these foregoing engine/air handling system operating parameters could alternatively be used as the engine/air handling system operating parameter, AHOP, in this example at step 162 of algorithm 150. Those skilled in the art will recognize that any such engine/air handling system operating parameters could also be used as the engine/air handling system operating parameter, AHOP, when the actuator command, AC, corresponds to a command by control computer 42 to control any of the other air handling mechanism actuators 58, 68, and 82.

Following step 162, algorithm execution advances to step 164 where control computer 42 is operable to diagnose the operation of the air handling mechanism being tested, and produce a fault condition value, FC, as a function of AC, AP and AHOP. In general, control computer 42 is operable to execute step 164 by comparing the engine/air handling system operating parameter, AHOP, and the actuator position value, AP, to one or more threshold values and/or operating windows therefore, and diagnose any failures/faults associated with the air handling mechanism, mechanism actuator and/or actuator position sensor based on the outcome of such comparisons. The comparison function may be implemented in the form of one or more equations, charts, graphs and/or tables, and is preferably stored in memory 45. An example of one implementation of step 164 will be described in detail hereinafter with respect to FIG. 4.

Following step 164, algorithm execution advances to step 166 where control computer 42 is operable to log any air handling system fault/failure conditions, determined at step 164, in memory 45 and/or notify an operator of the vehicle by activating an appropriate one or more of the warning indicators 130.

Figure 3A:
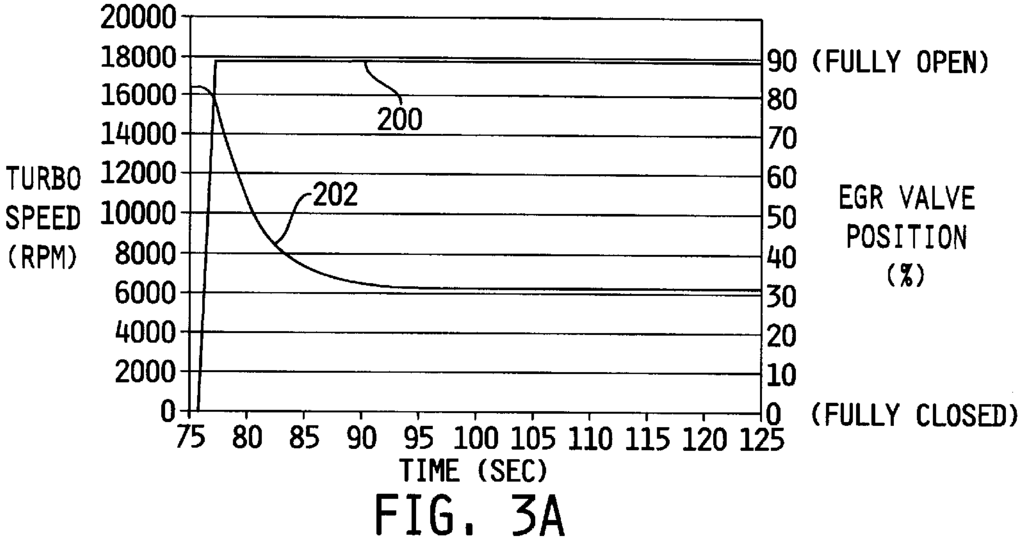
FIG. 3A is a plot of turbocharger speed and EGR valve position vs. time illustrating one example implementation of the diagnosis system of the present invention under normal operating conditions.
Figure 3B:
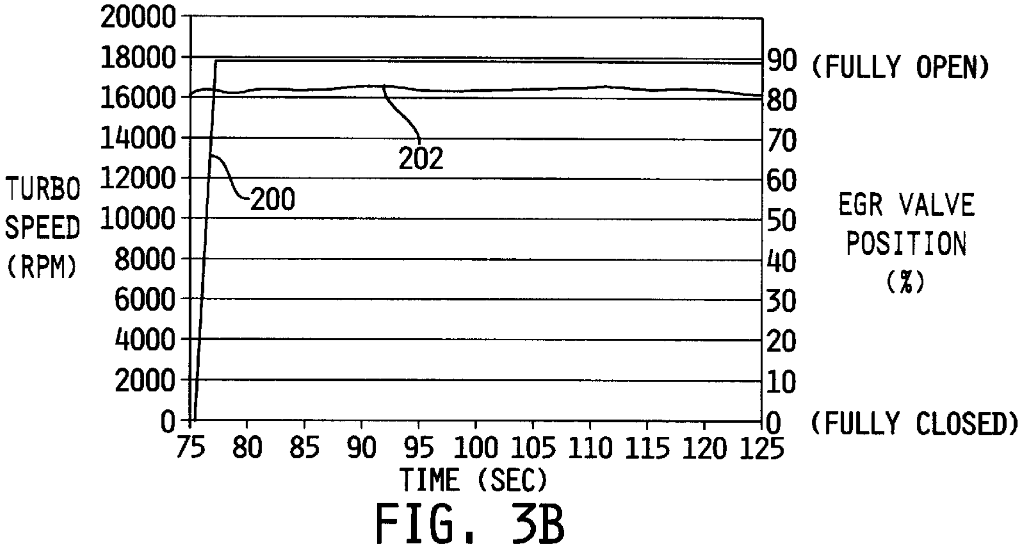
FIG. 3B is a plot of turbocharger speed and EGR valve position vs. time illustrating one fault mode relating to the example of FIG. 3A.
Figure 3C:
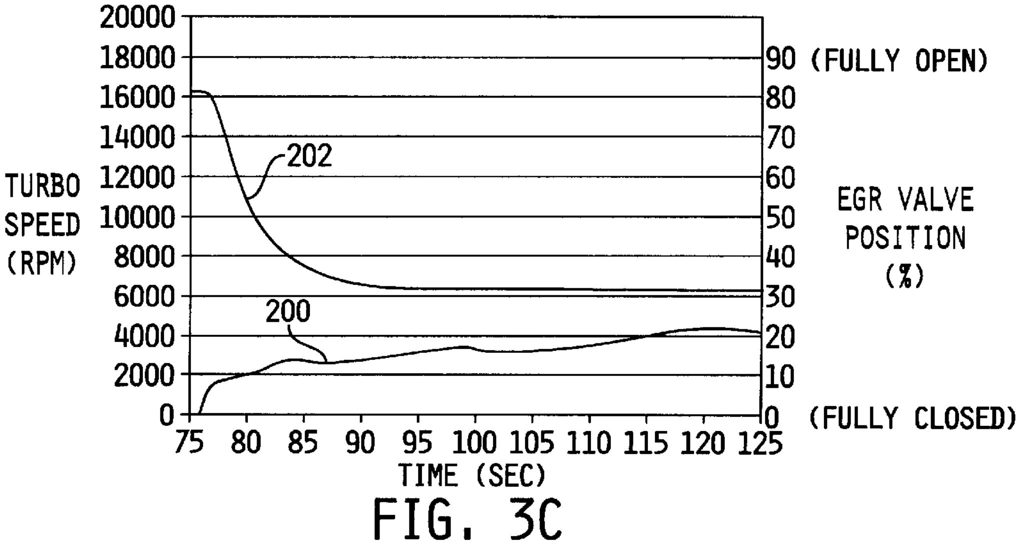
FIG. 3C is a plot of turbocharger speed and EGR valve position vs. time illustrating another fault mode relating to the example of FIG. 3A.
Figures 3D, 4:
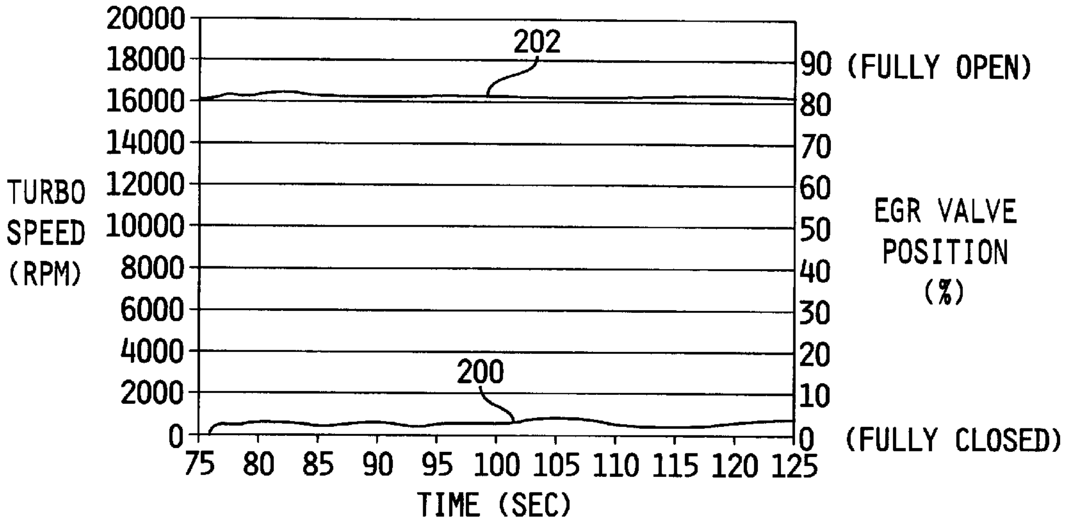
FIG. 3D is a plot of turbocharger speed and EGR valve position vs. time illustrating yet another fault mode relating to the example of FIG. 3A.
FIG. 4 is a fault table summarizing the various fault modes illustrated in FIGS. 3A–3D.

Referring now to FIGS. 3A–4, a specific example of algorithm 150 is illustrated wherein the air handling mechanism being tested is the EGR valve 36, and the actuator command, AC, corresponds to an EGR valve actuator command produced by control computer 42 on signal path 52, the air handling system actuator position, AP, corresponds to the EGR valve position signal, EGRP, produced by sensor 54 on signal path 56, and engine/air handling system operating parameter, AHOP, is turbocharger rotational speed signal, TS, produced by sensor 118 on signal path 120. Referring to FIG. 3A, a plot of EGR valve position 200 and turbocharger speed 202 is shown wherein control computer 42 has commanded the EGR valve actuator 50 from a fully closed position to a fully open position. The signals 200 and 202 in FIG. 3A represent a properly functioning EGR valve 36, actuator 50 and position sensor 54, and the turbocharger speed 202 accordingly decreases to a steady state value (e.g., 6000+RPM) within approximately 20 seconds of the EGR valve actuator command, AC. In this case, the delay time, T, could be set to, for example, 25 seconds.

FIG. 3B represents the same test as that carried out in the example of FIG. 3A, but wherein the turbocharger speed signal 202 does not deviate significantly as a result of the EGR valve actuator command, AC, yet the EGR valve actuator position sensor 54 produces a signal indicative of a properly functioning actuator 50. FIG. 3C likewise represents the same test as that carried out in the example of FIG. 3A, but wherein the EGR valve actuator position signal 200 indicates that the EGR valve 36 did not move from its fully closed position to its fully open position, yet the turbocharger speed signal 202 is substantially identical to that of FIG. 3A and thereby indicative of a properly functioning actuator 50. FIG. 3D likewise represents the same test as that carried out in the example of FIG. 3A, but wherein the EGR valve actuator position signal 200 indicates that the EGR valve 36 did not move from its fully closed position to its fully open position, and the turbocharger speed signal 202 does not deviate significantly as a result of the EGR valve actuator command, AC.

Referring to FIG. 4, a table 210 of turbocharger speed and EGR valve position threshold values is shown, wherein table 210 is illustrative of one embodiment of step 164 of algorithm 150. In the example shown in FIG. 4, a single turbocharger speed threshold of 1000 RPM is established and a single EGR valve position threshold of 50% is established. Table 210 is populated with fault/failure conditions associated with the EGR valve 36, and serves to isolate and identify specific EGR valve-related failure conditions. For example, FIG. 3A represents the case where the EGR valve position signal 200 is greater than 50% and the turbocharger speed value (after delay period, T) is less than 1000 RPM, and accordingly corresponds to a NO FAULT diagnosis, indicating that EGR valve 36, actuator 50 and EGR valve position sensor 54 are all operating normally. By contrast, FIG. 3B represents the case where the EGR valve position signal 200 is greater than 50%, but where the turbocharger speed value is greater than 1000 RPM. In this case, the EGR valve 36 may be stuck closed or may be exhibiting some other fault condition that causes the EGR valve actuator position sensor 54 to produce a value 200 corresponding to a fully open EGR valve 36, whereas the EGR valve 36 has apparently not responded properly to the EGR valve actuator command, AC, since the turbocharger speed signal 202 has not deviate significantly as a result of the EGR valve actuator command, AC. Table 210 accordingly identifies the condition represented in FIG. 3B as an EGR VALVE STUCK CLOSED fault/failure indicative of some type of fault or failure associated with the EGR valve 36 itself.

FIG. 3C represents the case where the EGR valve position signal 200 is less than 50%, and where the turbocharger speed value is less than 1000 RPM. In this case, the EGR valve actuator position sensor 54 is faulty since the EGR position value 200 produced by sensor 54 indicates that the EGR valve actuator 50 has not deviated significantly from its closed position, yet the turbocharger speed signal 202 has decreased as an expected result of the EGR valve actuator command, AC, thereby indicating that the EGR valve 36 has indeed moved to its fully open position. Table 210 accordingly identifies the condition represented in FIG. 3C as an EGR VALVE POSITION SENSOR FAULT, indicative of some type of fault or failure associated with the EGR valve position sensor 54.

Finally, FIG. 3D represents the case where the EGR valve position signal 200 is less than 50%, and the turbocharger speed value is greater than 1000 RPM. In this case, the EGR valve actuator 50 is faulty since the EGR position value 200 produced by the EGR valve actuator position sensor 54 indicates that the EGR valve actuator 50 has not properly responded to the EGR valve open command, and the turbocharger speed signal 202 has not deviated significantly from its initial value, thereby indicating that the EGR valve 36 has not moved significantly from its closed position as the result of the EGR valve actuator command, AC. Table 210 accordingly identifies the condition represented in FIG. 3C as an EGR VALVE ACTUATOR INOPERATIVE fault/failure, indicative of some type of fault or failure associated with the EGR valve actuator 50.

It is to be understood that the embodiment of table 210 illustrated in FIG. 4 is provided only by way of example, and that the present invention contemplates embodiments of table 210 including multiple AHOP and/or AP threshold values, and corresponding fault/failure definitions. Additionally, it should be understood that the illustration of algorithm 150 shown and described with respect to FIGS. 3A–4 is also provided only be way of example, and that the present invention contemplates applying algorithm 150 to the diagnosis of other air handling mechanisms, and/or diagnosing the operation of any such air handling mechanism as a function of any of a number of engine/air handling system operating parameters, AHOP. Examples, of air handling mechanism actuator position signal and engine/air handling system operating parameter, AHOP, combinations that may be used to implement the diagnosis algorithm 150 for various air handling mechanisms are summarized, but not thereby limited, in the following TABLE 1:

TABLE 1

| AIR HANDLING MECHANISM | AIR HANDLING MECHANISM ACTUATOR POSITION SIGNAL, AP | AIR HANDLING SYSTEM OPERATING PARAMETER, AHOP |
|---|---|---|
| EGR valve 36 | EGR valve actuator position, EGRP | Turbocharger speed, TS, Ambient air mass flow rate, $M_I$, Intake air pressure, IAP, Intake air temperature, IAT, Exhaust pressure, EXP, Pressure differential, ΔP, across EGR flow restriction mechanism, and/or EGR mass flow rate, $M_{EGR}$ |
| Variable geometry turbocharger turbine 26 | VGT actuator position, VGTP | Turbocharger speed, TS, Ambient air mass flow rate, $M_I$, Intake air pressure, IAP, Pressure differential, ΔP, across EGR flow restriction mechanism, Exhaust pressure, EXP, and/or EGR mass flow rate, $M_{EGR}$ |
| Exhaust throttle 66 | Exhaust throttle actuator position, ETP | Turbocharger speed, TS, Ambient air mass flow rate, $M_I$, Intake air pressure, IAP, Pressure differential, ΔP, across EGR flow restriction mechanism, Exhaust pressure, EXP, and/or EGR mass flow rate, $M_{EGR}$ |
| Wastegate 76 | Wastegate actuator position, WP | Turbocharger speed, TS, Ambient air mass flow rate, $M_I$, Intake air pressure, IAP, Pressure differential, ΔP, across EGR flow restriction mechanism, Exhaust pressure, EXP, and/or EGR mass flow rate, $M_{EGR}$ |

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, while the concepts of the present invention have been described in the context of engine exhaust handling mechanisms, those skilled in the art will appreciate that such concepts are directly applicable to other actuators associated with the operation of engine 12. For example, system 10 may include an intake air throttle of known construction and disposed in fluid communication with intake conduit 20 between compressor 16 and intake manifold 14, wherein such an intake throttle may be controlled in a known manner to modulate the flow rate of fresh air, and thereby the flow rate of EGR, to the intake manifold 14. The diagnostic concepts of the present invention, as will be appreciated, may be applied directly to such an air handling mechanism similarly as described hereinabove. Those skilled in the art will recognize other controllable engine, vehicle, and/or air handling systems mechanisms to which the concepts of the present invention may be applied, and such other applications are intended to fall within the scope of the present invention.

What is claimed is:

1. A diagnostic system for an air handling mechanism of an air handling system for an internal combustion engine, the system comprising:

an actuator responsive to an actuator command to control position of the air handling mechanism;

a first sensor producing a first signal indicative of a position of the air handling mechanism relative to a reference position;

a second sensor producing a second signal indicative of an operation of another component of the air handling system separate from, yet responsive to changes in the position of, the air handling mechanism; and a control computer producing said actuator command, said control computer thereafter diagnosing an operating condition of said air handling mechanism as a function of said first and second signals.

2. The system of claim 1 wherein said first signal corresponds to a position of said actuator relative to a reference actuator position.

3. The system of claim 1 wherein said control computer is operable to determine that the air handling mechanism is operating normally if, after producing said actuator command, said first signal indicates that the position of the air handling mechanism is within a threshold value of the position corresponding to the actuator command and the second signal indicates that the operation of the another component of the air handling system is within a range of expected operational values.

4. The system of claim 1 wherein said control computer is operable to determine a fault associated with said first sensor if, after producing said actuator command, said first signal indicates that the position of the air handling mechanism is within a threshold value of the position corresponding to the actuator command and the second signal indicates that the operation of the another component of the air handling system is outside of a range of expected operational values.

5. The system of claim 4 further including a memory, said control computer logging a fault code within said memory corresponding to said fault associated with said first sensor.

6. The system of claim 4 further including at least one warning indicator, said control computer activating said at least one warning indicator upon detection of said fault associated with said first sensor.

7. The system of claim 1 wherein said control computer is operable to determine a fault associated with the air handling mechanism if, after producing said actuator command, said first signal indicates that the position of the air handling mechanism is not within a threshold value of the position corresponding to the actuator command and the second signal indicates that the operation of the another component of the air handling system is within a range of expected operational values.

8. The system of claim 7 further including a memory, said control computer logging a fault code within said memory corresponding to said fault associated with the air handling mechanism.

9. The system of claim 7 further including at least one warning indicator, said control computer activating said at least one warning indicator upon detection of said fault associated with the air handling mechanism.

10. The system of claim 1 wherein said control computer is operable to determine a fault associated with the said actuator if, after producing said actuator command, said first signal indicates that the position of the air handling mechanism is not within a threshold value of the position corresponding to the actuator command and the second signal indicates that the operation of the another component of the air handling system is outside of a range of expected operational values.

11. The system of claim 10 further including a memory, said control computer logging a fault code within said memory corresponding to said fault associated with said actuator.

12. The system of claim 10 further including at least one warning indicator, said control computer activating said at least one warning indicator upon detection of said fault associated with said actuator.

13. The system of claim 1 wherein the air handling mechanism is an EGR valve controlling a flow of exhaust gas from an exhaust manifold of the engine to an intake manifold of the engine;

and wherein said first signal corresponds to a position of said EGR valve relative to a reference EGR valve position.

14. The system of claim 13 wherein said second sensor is a speed sensor coupled to a turbocharger disposed in fluid communication with said intake and exhaust manifolds, said second signal indicative of rotational speed of said turbocharger.

15. The system of claim 13 wherein said second sensor is a pressure sensor in fluid communication with air entering said intake manifold, said second signal indicative of a pressure of air entering said intake manifold.

16. The system of claim 13 wherein said second sensor is a temperature sensor in fluid communication with air entering said intake manifold, said second signal indicative of a temperature of air entering said intake manifold.

17. The system of claim 13 wherein said second sensor is a mass flow sensor in fluid communication with said flow of exhaust gas from said exhaust manifold to said intake manifold, said second signal indicative of a mass flow rate of exhaust gas flowing from said exhaust manifold to said intake manifold.

18. The system of claim 13 wherein said second sensor is a pressure sensor in fluid communication with exhaust gas produced by the engine, said second signal indicative of a pressure of exhaust gas produced by the engine.

19. The system of claim 13 further including a turbocharger having a compressor in fluid communication with said intake manifold;

and wherein said second sensor is a mass air flow sensor in fluid communication with an air inlet to said compressor, said second signal indicative of a mass flow rate of air entering said compressor.

20. The system of claim 1 further including a turbocharger having a compressor in fluid communication with an intake manifold of the engine, and a turbine having a turbine inlet fluidly coupled to an exhaust manifold of the engine via a first exhaust conduit and a turbine outlet fluidly coupled to ambient via a second exhaust conduit;

and wherein the air handling mechanism is a flow control mechanism controlling either of an exhaust gas swallowing capacity and an exhaust gas swallowing efficiency of said turbine;

and wherein said first signal corresponds to a position of said flow control mechanism relative to a reference flow control mechanism position.

21. The system of claim 20 wherein said flow control mechanism is a geometry varying mechanism operable to vary an internal geometry, and therefore said exhaust gas swallowing capacity, of said turbine;

and wherein said first signal corresponds to a position of said actuator relative to a reference actuator position.

22. The system of claim 20 wherein said flow control mechanism is an exhaust throttle disposed in-line with either of said first and second exhaust conduits, said exhaust throttle operable to control a flow rate of exhaust gas through, and therefore said exhaust gas swallowing efficiency, of said turbine;

and wherein said first signal corresponds to a position of said exhaust throttle relative to a reference exhaust throttle position.

23. The system of claim 20 wherein said flow control mechanism is a wastegate valve having an inlet fluidly coupled to said first exhaust conduit and an outlet coupled to said second exhaust conduit, said wastegate valve operable to control an amount of exhaust gas supplied to, and therefore said exhaust gas swallowing efficiency of, said turbine;

and wherein said first signal corresponds to a position of said wastegate valve relative to a reference wastegate valve position.

24. The system of claim 20 wherein said second sensor is a speed sensor coupled to a turbocharger disposed in fluid communication with said intake and exhaust manifolds, said second signal indicative of rotational speed of said turbocharger.

25. The system of claim 20 wherein said second sensor is a pressure sensor in fluid communication with air entering said intake manifold, said second signal indicative of a pressure of air entering said intake manifold.

26. The system of claim 20 wherein said second sensor is a temperature sensor in fluid communication with air entering said intake manifold, said second signal indicative of a temperature of air entering said intake manifold.

27. The system of claim 20 further including a third exhaust conduit having an inlet fluidly coupled to said first exhaust conduit and an outlet fluidly coupled to said intake manifold;

and wherein said second sensor is a mass flow sensor in fluid communication with said third exhaust conduit, said second signal indicative of a mass flow rate of exhaust gas flowing from said first exhaust conduit to said intake manifold.

28. The system of claim 20 wherein said second sensor is a pressure sensor in fluid communication with said first exhaust conduit, said second signal indicative of a pressure of exhaust gas within said first exhaust conduit.

29. The system of claim 20 wherein said second sensor is a mass air flow sensor in fluid communication with an air inlet to said compressor, said second signal indicative of a mass flow rate of air entering said compressor.

30. A method of diagnosing an air handling mechanism of an air handling system for an internal combustion engine, the method comprising the steps of:

commanding an actuator of the air handling mechanism to a first position;

determining, after a predefined time period following the commanding step, a position of the air handling mechanism relative to a reference position;

determining, after the predefined time period following the commanding step, an operating condition of another component of the air handling system separate from, yet responsive to changes in the position of, the air handling mechanism; and diagnosing the air handling mechanism as a function of the position of the air handling mechanism and the operating condition of the another component of the air handling system.

31. The method of claim 30 further including the steps of:

determining a pre-test engine operating condition; and executing the commanding, determining and diagnosing steps only if the pre-test engine operating condition is within a predefined range.

32. The method of claim 31 wherein the pre-test engine operating condition is rotational speed of the engine.

33. The method of claim 31 wherein the pre-test engine operating condition is engine load.

34. The method of claim 30 wherein the diagnosing step includes determining that the air handling mechanism is operating normally if the position of the air handling mechanism is within a threshold value of the first position and the operation of the another component of the air handling system is within a range of expected operational values.

35. The method of claim 30 wherein the air handling mechanism includes a position sensor operable sense a position of the air handling mechanism relative to a reference position;

and wherein the diagnosing step includes determining an air handling mechanism position sensor fault if the position of the air handling mechanism is within a threshold value of the first position and the operation of the another component of the air handling system is not within a range of expected operational values.

36. The method of claim 35 further including the step of logging a fault code within memory corresponding to the air handling mechanism position sensor fault.

37. The method of claim 35 further including the step of activating at least one warning indicator upon detection of the air handling mechanism position sensor fault.

38. The method of claim 30 wherein the diagnosing step includes determining a fault associated with the air handling mechanism if the position of the air handling mechanism is not within a threshold value of the first position and the operation of the another component of the air handling system is within a range of expected operational values.

39. The method of claim 38 further including the step of logging a fault code within memory corresponding to the fault associated with the air handling mechanism.

40. The method of claim 38 further including the step of activating at least one warning indicator upon detection of the fault associated with the air handling mechanism.

41. The method of claim 30 wherein the diagnosing step includes determining a fault associated with the actuator if the position of the air handling mechanism is not within a threshold value of the first position and the operation of the another component of the air handling system is not within a range of expected operational values.

42. The method of claim 41 further including the step of logging a fault code within memory corresponding to the fault associated with the actuator.

43. The method of claim 41 further including the step of activating at least one warning indicator upon detection of the fault associated the said actuator.

* * * * *